United States Patent [19]

Nakayama et al.

[11] Patent Number: 5,126,101
[45] Date of Patent: Jun. 30, 1992

[54] APPARATUS FOR CLEANING UP REACTOR COOLANT AND METHOD OF CONTROLLING THE SAME

[75] Inventors: Tadakazu Nakayama, Hitachi; Tomoko Sugi; Toshihisa Tsukiyama, both of Katsuta; Ryozo Tsuruoka; Shizuka Hirako, both of Hitachi, all of Japan

[73] Assignees: Hitachi, Ltd.; Hitaching Engineering Co., Ltd., Ibaraki, Japan

[21] Appl. No.: 357,168

[22] Filed: May 26, 1989

[30] Foreign Application Priority Data

May 30, 1988 [JP] Japan .................................. 63-130403

[51] Int. Cl.⁵ ................................................ G21C 9/00
[52] U.S. Cl. ..................................... 376/310; 376/313
[58] Field of Search ............... 376/309, 310, 313, 316, 376/370, 281, 282, 283

[56] References Cited

U.S. PATENT DOCUMENTS 4,663,116  5/1987  Masuhara et al. .................. 376/370

*Primary Examiner*—Brooks H. Hunt
*Assistant Examiner*—Frederick H. Vess
*Attorney, Agent, or Firm*—Antonelli, Terry, Stout & Kraus

[57] ABSTRACT

An apparatus for cleaning up reactor coolant includes a piping for taking out water in a reactor core, and this piping is provided separately from a primary loop recirculation piping and has its open end located at the bottom of a reactor pressure vessel. The taking-out piping extends upward from the open end within the reactor pressure vessel and extends through and outside of the side wall of the reactor pressure vessel. In a preferred form, the taking-out piping is provided near the highest position of its portion outside the reactor pressure vessel with a siphon brake valve.

7 Claims, 5 Drawing Sheets

APPARATUS FOR CLEANING UP REACTOR COOLANT AND METHOD OF CONTROLLING THE SAME

BACKGROUND OF THE INVENTION

1. Field of the Invention

The present invention relates to an apparatus for cleaning up reactor coolant in a boiling water reactor plant and, more particularly, to a reactor-coolant cleanup apparatus suitable for use in mitigating radiation exposure which may occur during scheduled inspections due to the presence of a piping provided for taking out reactor coolant at the bottom of a reactor pressure vessel, as well as to a method of controlling such an apparatus.

2. Description of the Related Art

As disclosed in Japanese Patent Unexamined Publication No. 58-201094, a conventional type of reactor-coolant cleanup system for use in a boiling water reactor plant is in general arranged such that reactor coolant is extracted from its reactor pressure vessel through a piping connected to the lowest portion of the reactor pressure vessel and a piping branching off a primary loop recirculation piping. The reactor coolant flows in both of these pipings intermingle with each other within a primary containment vessel and is, in turn, passed through a heat exchanger, a pump, and a cleanup device which constitutes part of the reactor-coolant cleanup system. Thereafter, this reactor coolant intermingles with the flow of water fed through a reactor feedwater piping, and is returned to the reactor pressure vessel.

The piping disposed at the lowest portion of the reactor pressure vessel performs the following functions. The first function is to discharge the crud component accumulated at the bottom portion of the reactor pressure vessel from the reactor pressure vessel together with the reactor coolant. The second function is to completely discharge the reactor coolant from the reaction pressure vessel for the purposes of inspection or modification. The third function is to circulate low-temperature reactor coolant stagnating at a lower portion of the reactor pressure vessel by means of the reactor-coolant cleanup system (without utilizing any recirculation system) when the reactor is in a hot stand-by state in which the normal running of the reactor is not carried out.

The piping connected to the lowest portion of the reactor pressure vessel is arranged to discharge the reactor coolant from the inside of a core shroud surrounding a reactor core directly into the exterior of the reactor pressure vessel. For this reason, if an accident such as breakage should occur in such a piping, the reactor coolant is fed into the reactor core through an emergency core cooling system. However, even after the reactor core has been flooded, the discharge of the reactor coolant through the piping is continued. Accordingly, it is impossible to form the piping from a pipe having a sufficiently large diameter, and the diameter of this piping is commonly one-fourth to one-fifth the diameter of a piping provided for taking out water in the recirculation piping. As a result, the crud component contained in the reactor coolant tends to easily stick to the inner surface of the piping and there is a tendency for the dose rate of the piping to increase.

The outlet piping and the inlet piping of the primary loop recirculation piping are connected to the reactor pressure vessel in the outside of the reactor core shroud (not shown). Accordingly, even in a case where the primary loop recirculation piping is partially broken, after the reactor core has been flooded by the operation of the emergency core cooling system, the reactor coolant in the reactor core is not discharged through the recirculation piping directly into the exterior of the reactor pressure vessel. It is, therefore, possible to increase the diameter of the recirculation piping in order to prevent the crud component from sticking to the inner surface of the recirculation piping.

Further, the piping connected to the lowest portion of the reactor pressure vessel is located at a structurally lower position. It follows, therefore, that the proportion of the length of horizontally extending pipe portions to the overall length of such a piping is large. This fact also causes the crud component contained in the reactor coolant to stick to the inner surface of the piping and, hence, increases the dose rate of the piping.

As described above, in the prior art, the crud component in the reactor coolant sticks to the inner surface of the piping connected to the lowest portion of the reactor pressure vessel to cause an increase in the dose rate of the piping. This increase in the dose rate constitutes a radiation source which brings about an increase in the dose rate of the surroundings within the primary containment vessel during scheduled inspections. In the prior art, however, no consideration is given to this problem, and it has been impossible, therefore, to avoid the problem that workers who need to enter the primary containment vessel for the purposes of scheduled inspections may undergo serious radiation exposure. In order to mitigate this radiation exposure, it has been proposed that a shielding made of lead, iron, or the like be employed. Although this proposal utilizes a method of installing a lead plate or an iron plate directly onto the piping, it is necessary to install a support for preventing the weight of the shielding from being applied directly to the piping, and the installation of this kind of support incurs an increase in cost. Moreover, the installation of this support inevitably narrows the working space in the primary containment vessel and, therefore, leads to a deterioration in the efficiency of operation during scheduled inspections.

SUMMARY OF THE INVENTION

It is, therefore, an object of the present invention to mitigate the radiation exposure of workers during scheduled inspections by reducing the dose rate of a piping connected to the lowest portion of a reactor pressure vessel without deteriorating the function of the piping.

To achieve the above object, since the sticking of the crud component contained in reactor coolant to the inner surface of the piping leads to an increase in the dose rate of the piping, it is necessary to prevent the crud component from sticking to the inner surface of this piping. Moreover, it is necessary that the dose rate be reduced by using a shielding made of lead, iron, or the like.

In accordance with the present invention, there is provided a structure for preventing the sticking of the crud component by utilizing the phenomenon in which, as the flow velocity in the piping becomes smaller or as the proportion of horizontal pipe portions is increased, the crud component more easily sticks to the inner surface of the piping. Moreover, the present invention utilizes the steel plate itself of the reactor pressure vessel as a shielding without the need of employing an additional shielding.

In accordance with the present invention, a piping, which has heretofore been connected to the lowest portion of the reactor pressure vessel and extended downward therefrom, is disposed inside the reactor pressure vessel and is arranged to extend into the exterior of the reactor pressure vessel at a position which is higher than the lowest portion of the reactor pressure vessel.

DESCRIPTION OF THE PREFERRED EMBODIMENTS

Figure 1:
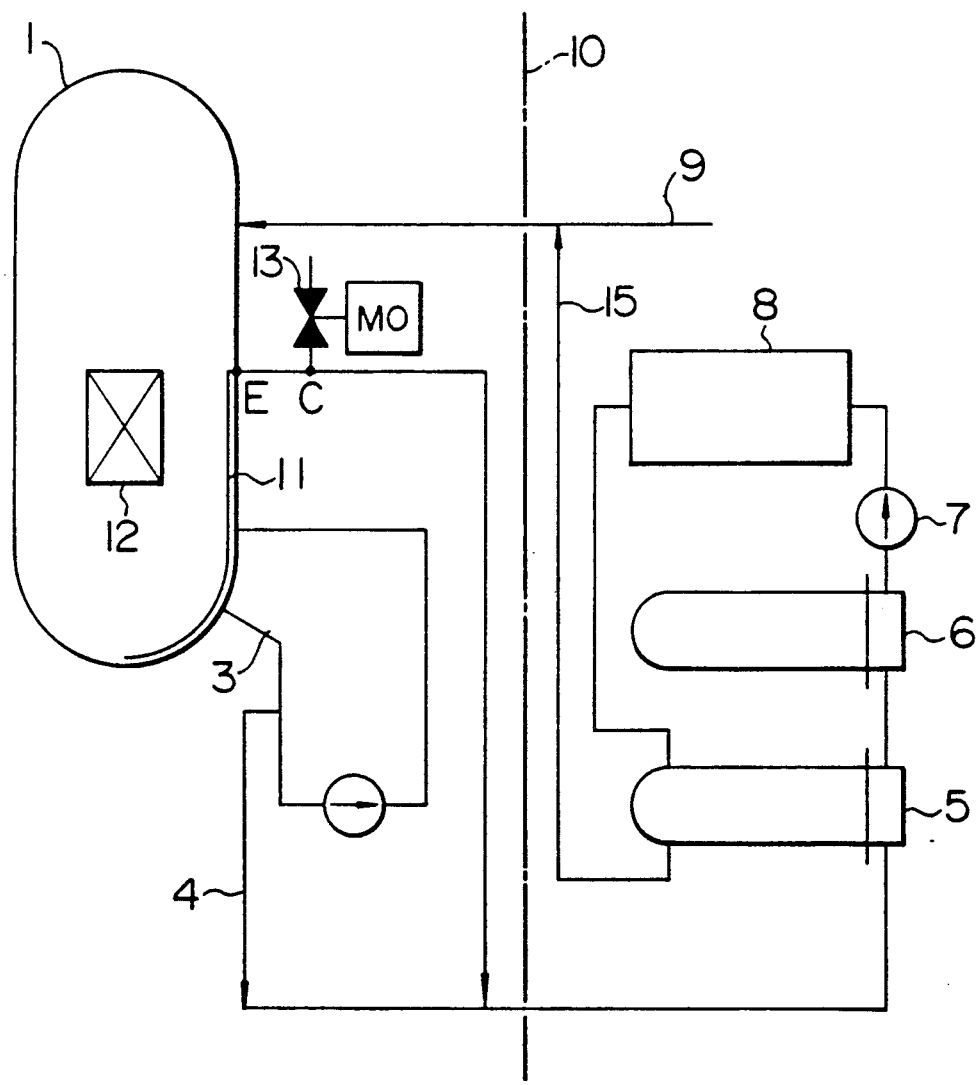
FIG. 1 is a schematic diagram showing an apparatus for cleaning up reactor coolant in accordance with a first embodiment of the present invention.

As shown in FIG. 1, an apparatus for cleaning up reactor coolant in accordance with a first embodiment of the present invention includes a piping 11 having its open end at the bottom of a reactor pressure vessel 1, a piping 4 branching off a primary loop recirculation piping 3 and being connected to the piping 11, a regenerative heat exchanger 5, a non-regenerative heat exchanger 6, a pump 7, a cleanup device 8, a piping 15 extending from the cleanup device 8 to a reactor feedwater piping 9, and a siphon brake valve 13 provided at the highest position C in the piping 11.

The piping 11 for taking out the reactor coolant in the reactor pressure vessel 1 is arranged to extend through the side wall of the reactor pressure vessel 1 at a position E which is higher than the position of a reactor core 12 within the reactor pressure vessel 1.

In operation, during normal running of the reactor and during the hot stand-by period of the same, the siphon brake valve 13 is closed to cut off communication with the atmosphere. The crud component accumulated in the bottom portion of the reactor pressure vessel 1 flows through the piping 11 together with the reactor coolant and then intermingles with the reactor coolant flowing through the branch piping 4. The crud component which has intermingled with the reactor component from the branch piping 4 passes through the regenerative heat exchanger 5 and the non-regenerative heat exchanger 6 and is then fed into the cleanup device 8 by means of the pump 7. After the crud component has been eliminated by the cleanup device 8, the reactor coolant flows through the piping 15 into the reactor feedwater piping 9 and is returned to the reactor pressure vessel 1.

During inspection or modification of the reactor, the siphon brake valve 13 is closed to cut off communication with the atmosphere. The reactor coolant in the reactor pressure vessel 1 flows out of it together with the crud component accumulated in the bottom portion of the reactor pressure vessel 1. Thereafter, the reactor coolant is discharged into another portion through a piping (not shown) without being returned to the reactor pressure vessel 1 through the feedwater piping 9.

Should the reactor coolant be partially lost due to, for example, breakage of the piping 11 outside the reactor pressure vessel 1, the reactor pressure vessel 1 is replenished with the required amount of reactor coolant from an emergency core cooling system (not shown), whereby the reactor core 12 is again flooded with the reactor coolant. When the pressure in the reactor 12 falls to atmospheric pressure, the remote operable valve 13 for the siphon brake opens to the atmosphere to cancel out the siphon effect. Accordingly, if the supply of water into the reactor core 12 is stopped, the water level in the reactor core 12 does not fall below the height of the position c at which the siphon brake valve 13 and the piping 11 are connected to each other. Subsequently, the reactor coolant may be replenished by an amount corresponding to any fall in the water level due to evaporation, and it is therefore possible to cool the reactor core 12 by means of a residual-heat eliminating system (not shown).

Since, in this embodiment, the position E at which the piping 11 extends from the reactor pressure vessel 1 to the exterior is selected to be higher than the position of the reactor core 12, it is possible to ensure that the piping has a sufficiently large gradient as compared with the conventional arrangement where a corresponding piping is connected to the lowest portion of a reactor pressure vessel. Accordingly, the amount of crud component in the reactor coolant sticking to the inner surface of the piping 11 can be reduced by virtue of the effect of gravitation.

Figure 4:
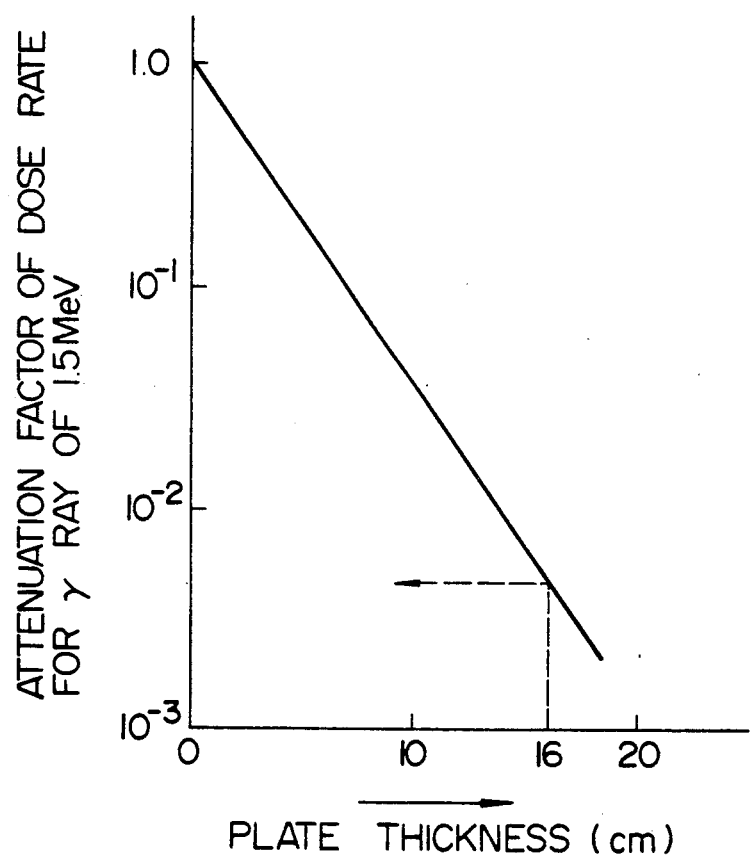
FIG. 4 is a graph showing the attenuation factor of a dose rate with respect to the thickness of a steel plate.

Since the piping 11 extends upward within the reactor pressure vessel 1, the radiation source leaking from the portion of the piping 11 which is accommodated in the reactor pressure vessel 1 is shielded by the steel plate thereof. As can be seen from FIG. 4 which shows the relationship between the thickness of the steel plate and the attenuation factor of the radiation source, the level of the radiation source (1.5 MeV) of the reactor coolant can be reduced to approximately 1/100 by virtue of the steel plate (approximately 16 cm thick) of the reactor pressure vessel 1. As described above, it is possible to decrease the radiation dose in the atmosphere in a primary containment vessel 10 during scheduled inspections and it is also possible to provide the effect of mitigating the radiation exposure of workers who must work within the primary containment vessel 10 during scheduled inspections.

If breakage should take place in the piping for taking out the reactor coolant through the lowest portion of the reactor pressure vessel, it is possible to easily cope with the accident.

Figure 2:
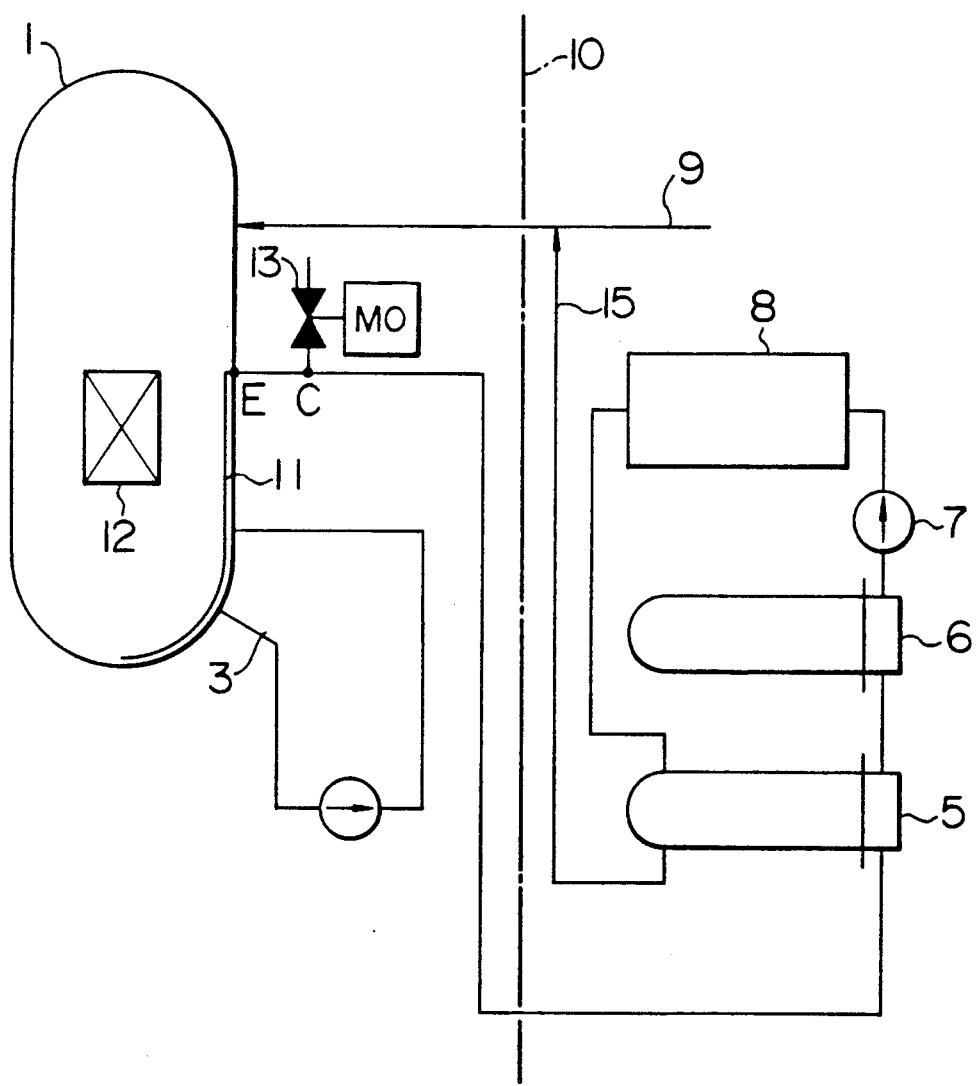
FIG. 2 is a schematic diagram showing an apparatus for cleaning up reactor coolant in accordance with a second embodiment of the present invention.

FIG. 2 shows an apparatus for cleaning up reactor coolant in accordance with a second embodiment of the present invention. In the figure, the same reference numerals are used to denote elements which are the same as those shown in FIG. 1. The reactor-coolant cleanup apparatus of FIG. 2 differs from that of FIG. 1 in that the piping 4 branching off the primary loop recirculation piping 3 and being connected to the piping 11 is eliminated.

In the operation of the apparatus shown in FIG. 2, the reactor coolant in the reactor pressure vessel 1 is taken out of it through the piping 11 alone. Accordingly, it is possible to increase the rate of reactor coolant taken out at the lowest portion of the reactor pressure vessel 1 through the piping 11 and, therefore, to increase the velocity of reactor-coolant flow in the piping 11. Accordingly, the amount of crud in the reactor coolant sticking to the inner surface of the piping 11 can be reduced and it is also possible to reduce the dose rate of the piping 11 by the synergistic effect of an increase in the velocity of reactor-coolant flow and a reduction in the amount of crud sticking to the inner surface of the piping 11 owing to the large gradient of the piping.

Since no piping branches off the primary loop recirculation piping 3, the welded portion which joints the primary loop recirculation piping 3 and the reactor coolant taking-out piping 4 can be eliminated. Accordingly, the number of portions to be inspected during an in-service inspection (ISI) while the reactor is in service can be decreased so that radiation exposure can be mitigated.

Figure 3:
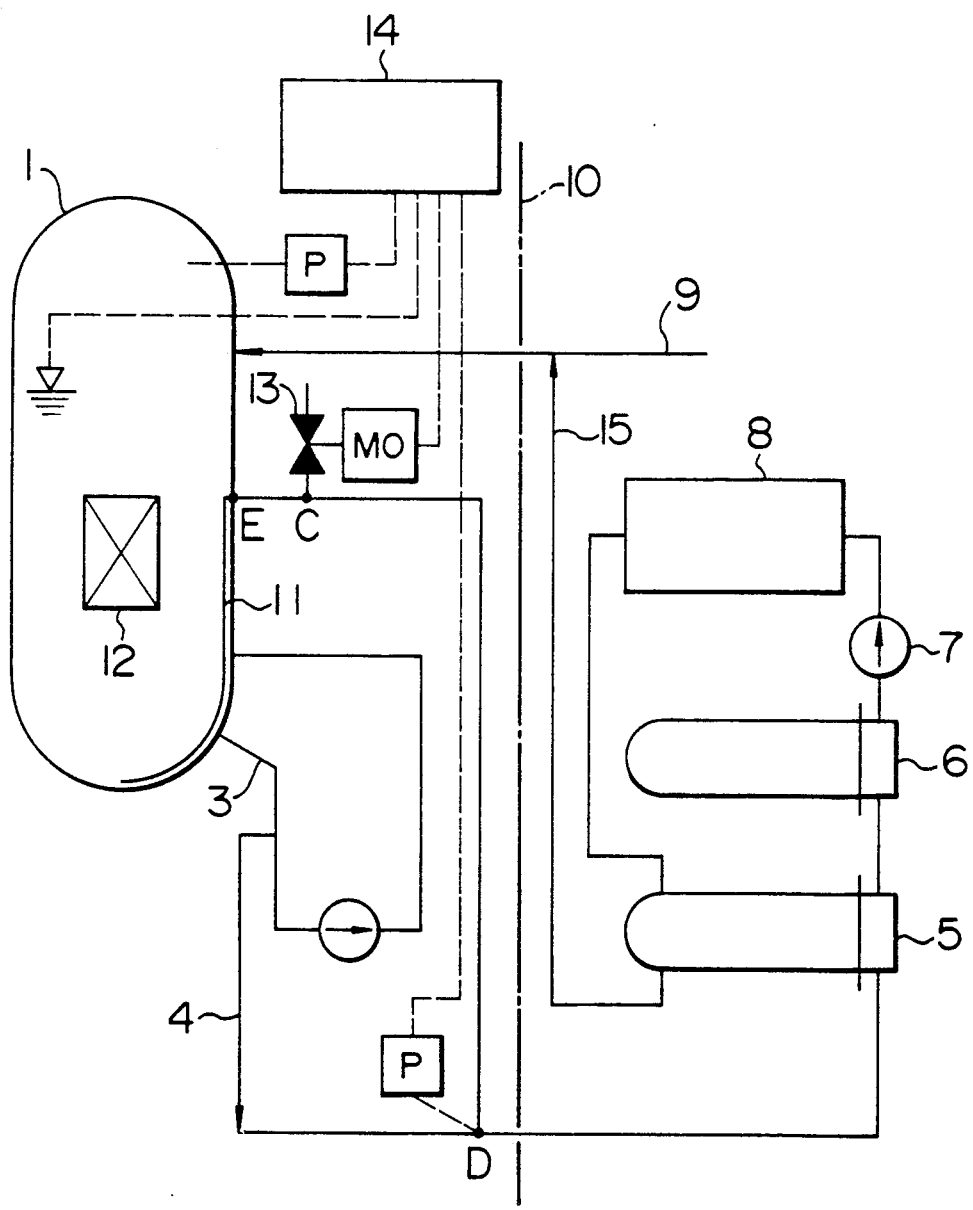
FIG. 3 is a schematic diagram showing an apparatus for cleaning up reactor coolant in accordance with a third embodiment of the present invention.

FIG. 3 shows an apparatus for cleaning up reactor coolant in accordance with a third embodiment of the present invention. In the figure, the same reference numerals are used to denote elements which are the same as those shown in FIG. 1. The reactor-coolant cleanup apparatus of FIG. 3 differs from the apparatus shown in FIG. 1 in that the former apparatus is provided with an automatic control device 14 for controlling the opening and closing of the siphon brake valve 13.

In the operation of the reactor-coolant cleanup apparatus of FIG. 3, if the piping 11 for taking out the reactor coolant at the lowest portion of the reactor pressure vessel 1 should be broken outside the reactor pressure vessel 1 and a loss-of-reactor-coolant accident should thereby be caused, a pressure gauge P is employed to monitor the pressure and water level in the reactor as well as the pressure in the piping. If it is determined (a) that the pressure in the aforesaid reactor pressure vessel 1 has fallen to a level equal to the atmospheric pressure and (b) that the water level in the reactor pressure vessel 1 has fallen to the position E at which the piping 11 is arranged to extend through the side wall of the reactor pressure vessel 1, the automatic control device 14 operates to open the siphon brake valve 13, enabling the accident to be handled rapidly and correctly.

Figure 5:
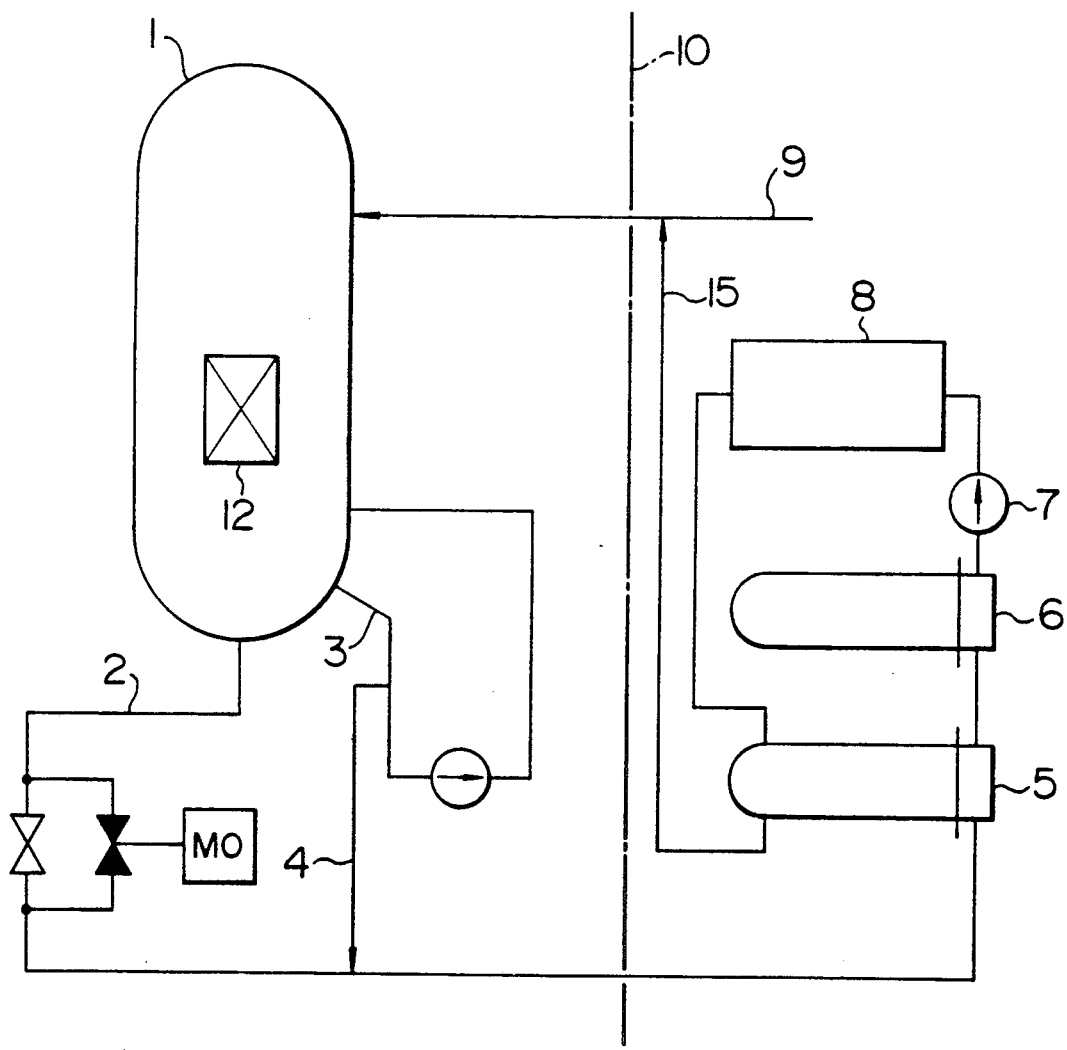
FIG. 5 is a schematic diagram showing a conventional type of apparatus for cleaning up reactor coolant.

FIG. 5 shows the system construction of a conventional reactor-coolant cleanup system for use in a boiling water reactor power plant. The reactor coolant in the reactor pressure vessel 1 is taken out of the primary containment vessel 10 by way of a piping 2 which is connected to the bottom of the reactor pressure vessel 1 and the branch piping 4 branching off the primary loop recirculation piping 3. The reactor coolant is then passed through the regenerative heat exchanger 5, the non-regenerative heat exchanger 6, a cleanup pump 7 for reactor coolant, and an apparatus 8 for cleaning up radioactive materials in that order. Thereafter, the reactor coolant is returned to the reactor pressure vessel 1 by way of the reactor feedwater piping 9. In this conventional example, no account is taken of counter-measures for reducing the dose rate of the reactor-coolant taking-out piping 2 connected to the bottom of the reactor pressure vessel 1.

In accordance with the present invention, the following advantages can be achieved.

(1) Since the piping for taking out reactor coolant extends out of the reactor pressure vessel at a position which is higher than the lowest portion thereof, the length of the horizontally extending portion of the piping can be decreased so that the amount of crud sticking to the inner surface of the piping within the reactor decreases. Accordingly, the intensity of the radiation source is reduced and the resultant radiation exposure can be mitigated to a further extent.

(2) Since the piping for taking out reactor coolant extends, within the reactor pressure vessel, to a position higher than the lowest portion of the reactor pressure vessel, the side wall of the reactor pressure vessel serves as shielding. Accordingly, it is possible to exclude a portion of the piping from the radiation source which contributes to radiation exposure.

(3) Since the piping for taking out reactor coolant extends, within the reactor pressure vessel, to a position higher than the lowest portion of the reactor pressure vessel, it is possible to reduce the amount of reactor coolant flowing out of the reactor pressure vessel due to accidents.

(4) If the piping which branches off the primary loop recirculation piping so as to extract a portion of the reactor coolant in the reactor is eliminated, it is possible to increase the velocity of flow in the piping for taking out water in the reactor core so that the amount of crud sticking to the inner surface of this piping can be reduced.

(5) Even if an accident should take place, after the pressure in the reactor pressure vessel has fallen to a level equal to atmospheric pressure, a siphon brake is applied to both the interior and the exterior of the reactor pressure vessel in a state wherein the water level in the reactor pressure vessel has reached the position at which the piping for taking out water in the reactor core extends through the side wall of the reactor pressure vessel, whereby the reactor core is maintained in a flooded state. It is, therefore, possible to easily cope with the accident.

(6) The inlet port of the piping for taking out water in the reactor core is located at the lowest portion of the reactor pressure vessel. Accordingly, in the case of a drain-off operation of the reactor pressure vessel, it is possible to drain all reactor coolant from the reactor pressure vessel by virtue of the siphon effect.

What is claimed is:

1. An apparatus for cleaning up reactor coolant, said apparatus comprising a piping for taking out water in a reactor core, said piping being provided separately from a primary loop recirculation piping and having its open end located at the bottom of a reactor pressure vessel, said taking-out piping being provided near the highest position of its portion outside said reactor pressure vessel with a siphon brake valve.

2. An apparatus as set forth in claim 1, further comprising a means for cleaning up radioactive materials and a branch piping branching off said primary loop recirculation piping and being connected to said taking-out piping.

3. In an apparatus for cleaning up reactor coolant in a boiling water reactor, which apparatus comprises a piping for taking out water in a reactor core, said piping being provided separately from a primary loop recirculation piping and having its open end located at the bottom of a reactor pressure vessel, and an apparatus for cleaning up radioactive materials, which is connected to said piping, the improvement comprising said piping arranged to extend upward from said open end within said reactor pressure vessel and extend through and outside of the side wall of said reactor pressure vessel, said taking-out piping being provided near the highest position of its portion outside said reactor pressure vessel with a siphon brake valve.

4. An apparatus as set forth in claim 3, wherein said taking-out piping and a primary loop recirculation piping are not connected to each other outside said reactor pressure vessel and constitute, outside said reactor pressure vessel, recirculation systems which are independent of each other.

5. In an apparatus for cleaning up reactor coolant in a boiling water reactor, which apparatus comprises a piping for taking out water in a reactor core, said piping having its open end located at the bottom of a reactor pressure vessel, and an apparatus for cleaning up radioactive materials, which is connected to said piping, the improvement comprising said piping arranged to extend upward from said open end within said reactor pressure vessel and extend through and outside of the side wall of said reactor pressure vessel, said taking-out piping being provided near the highest position of its portion outside said reactor pressure vessel with a siphon brake valve, and the portion of said taking-out piping which is provided with said siphon brake valve is located at a position which is higher than the position of said reactor core.

6. In a method of controlling an apparatus for cleaning up reactor coolant in a boiling water reactor, which apparatus includes a piping for taking out water in a reactor core, said piping being provided separately from a primary loop recirculation piping and having its open end located at the bottom of a reactor pressure vessel and being arranged to extend upward from said open end within the reactor pressure vessel through and outside of the side wall of said reactor pressure vessel and to be connected to an apparatus for cleaning up radioactive materials, as well as a siphon brake valve provided near the highest position of said taking-out piping, the improvement comprising the steps of preparing an automatic control device for controlling the opening and closing operation of said siphon brake valve and controlling said siphon brake valve to open the same when the pressure in said reactor pressure vessel has fallen to a level equal to atmospheric pressure and when the water level in said reactor pressure vessel has fallen to the position at which said taking-out piping extends through the side wall of the reactor pressure vessel.

7. In a method of controlling an apparatus for cleaning up reactor coolant in a boiling water reactor, which apparatus includes a piping for taking out water in a reactor core, said piping having its open end located at the bottom of a reactor pressure vessel and being arranged to extend upward from said open end within the reactor pressure vessel through and outside of the side wall of said reactor pressure vessel and to be connected to an apparatus for cleaning up radioactive materials, as well as a siphon brake valve provided near the highest position of said taking-out piping, the improvement comprising the steps of preparing an automatic control device for controlling the opening and closing operation of said siphon brake valve and controlling said siphon brake valve to open the same when the pressure in said reactor pressure vessel has fallen to a level equal to atmospheric pressure and when the water level in said reactor pressure vessel has fallen to the position at which said taking-out piping extends through the side wall of the reactor pressure vessel, the portion of said taking-out piping which is provided with said siphon brake valve being located at a position which is higher than the position of said reactor core accommodated in said reactor pressure vessel.

* * * * *